United States Patent
Opoku et al.

(10) Patent No.: US 12,534,369 B2
(45) Date of Patent: Jan. 27, 2026

(54) METHOD OF PREPARING CARBON NANOMATERIALS

(71) Applicant: SURGEPOWER MATERIALS, INC., New Braunfels, TX (US)

(72) Inventors: Michael Kwabena Opoku, San Marcos, TX (US); Gary W. Beall, New Braunfels, TX (US)

( * ) Notice: Subject to any disclaimer, the term of this patent is extended or adjusted under 35 U.S.C. 154(b) by 0 days.

(21) Appl. No.: 18/369,933

(22) Filed: Sep. 19, 2023

(65) Prior Publication Data

US 2024/0158236 A1     May 16, 2024

Related U.S. Application Data

(63) Continuation of application No. 17/164,770, filed on Feb. 1, 2021, now Pat. No. 11,760,633.

(60) Provisional application No. 62/968,958, filed on Jan. 31, 2020.

(51) Int. Cl.
| | |
|---|---|
| *C01B 32/15* | (2017.01) |
| *B82Y 30/00* | (2011.01) |
| *B82Y 40/00* | (2011.01) |

(52) U.S. Cl.
CPC .............. *C01B 32/15* (2017.08); *B82Y 30/00* (2013.01); *B82Y 40/00* (2013.01); *C01P 2004/64* (2013.01); *C01P 2006/12* (2013.01); *C01P 2006/14* (2013.01)

(58) Field of Classification Search
CPC ..... C01B 32/15; C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B82Y 30/00; B82Y 40/00; C01P 2004/64; C01P 2006/12; C01P 2006/14

See application file for complete search history.

(56) References Cited

U.S. PATENT DOCUMENTS

| | | | | |
|---|---|---|---|---|
| 5,985,232 | A * | 11/1999 | Howard | C01B 32/154 |
| | | | | 977/734 |
| 2010/0055025 | A1 * | 3/2010 | Jang | C25B 1/00 |
| | | | | 977/755 |
| 2012/0205594 | A1 * | 8/2012 | Bayer | B82Y 30/00 |
| | | | | 977/773 |

(Continued)

OTHER PUBLICATIONS

Sankar, et al., Ultrathin graphene nanosheets derived from rice husks for sustainable supercapacitor electrodes, New J. Chem. 2017; 41: 13762-13797 (Year: 2017).*

(Continued)

*Primary Examiner* — Daniel C. McCracken
(74) *Attorney, Agent, or Firm* — McDonnell Boehnen Hulbert & Berghoff LLP

(57) ABSTRACT

This disclosure relates generally to the field of carbon, graphene, energy storage materials, carbon films, and nanocomposites. Specifically, this disclosure relates to novel eco-friendly, cost-effective methods of preparing doped and/or intercalated carbon nanomaterials.

16 Claims, 12 Drawing Sheets

(56) References Cited

U.S. PATENT DOCUMENTS

2016/0211507 A1* 7/2016 Sharma ............... H01M 4/0402
2017/0247257 A1* 8/2017 Jung ..................... C01B 32/184

OTHER PUBLICATIONS

Panchakarla, et al., Boron- and nitrogen-doped carbon nanotubes and graphene, Inorganic Chimica Acta 2010; 363: 4163-4174 (Year: 2010).*

* cited by examiner

METHOD OF PREPARING CARBON NANOMATERIALS

CROSS-REFERENCE TO RELATED APPLICATIONS

This application claims the benefit of priority of U.S. Provisional Patent Application No. 62/968,958, filed Jan. 31, 2020, which is incorporated by reference in its entirety.

BACKGROUND OF THE DISCLOSURE

Field of the Disclosure

This disclosure relates generally to the field of carbon, graphene, energy storage materials, carbon films, and nanocomposites. Specifically, this disclosure relates to novel eco-friendly, cost-effective methods of preparing doped and/or intercalated carbon nanomaterials.

Description of Related Art

Carbon has several forms including amorphous carbon, carbon nanotubes, graphene, graphite, diamond, and the different carbon atom arrangements results in unique properties. The building block for several forms of carbon, graphene has been demonstrated to exhibit an extremely large specific surface area (e.g., 2630 $m^2/g$), good thermal conductivity (e.g., ca.5000/mK for single-layer graphene), high Young's modulus (e.g., 1.0 TPa), high charge mobility (e.g., 200 000 $cm^2/Vs$), excellent optical transparency, and flexibility. These superior properties make graphene a promising candidate for a large variety of applications, including energy storage.

The pristine graphene without foreign atom, however, is a zero bandgap material. As a result, this severely limited its application in electronic and many other devices. Adding foreign atom(s) or doping the carbon atoms in the graphitic structure or intercalation of the carbon structure is essential. The introduction of foreign atoms into carbon networks could cause electron modulation to change the charge distribution and electronic properties of carbon skeletons, which in turn affects their work function for electronic applications and enhances interactions with reactants to impart catalytic activities. Doping of the edge of graphene sheets with foreign atoms without damage of the carbon basal plane can also change its work function and impart solubility and catalytic activity while largely retaining the physicochemical properties of the pristine graphene. The dangling bonds at the edge of a graphene sheet have been demonstrated to be more reactive than the covalently bonded carbon atoms within the basal plane. As a result, edge-doping/functionalizing graphene materials can be taken as a promising approach to tune their properties for specific applications. Also, intercalation of the network carbon with foreign atoms provides a fully intercalated state material for electrochemical devices.

SUMMARY OF THE DISCLOSURE

One aspect of the disclosure provides a process for preparing a carbon nanomaterial. The carbon nanomaterial of the disclosure is doped and/or intercalated. Such process includes:
  providing a carbon-containing material to a reactor comprising a solvent;
  providing one or more of: an oxidizing or reducing solution, and a doping and/or intercalating agent to the reactor comprising the carbon-containing material to obtain a reaction mixture,
  heating the reaction mixture to a temperature and for a time period sufficient to obtain an intermediate material; and
  further heating the intermediate material to a temperature and for a time period sufficient to obtain the carbon nanomaterial.

Another aspect of the disclosure provides a carbon nanomaterial prepared by the process of the disclosure as described herein.

Another aspect of the disclosure provides methods for preparing a film of the carbon nanomaterial of the disclosure as described herein. Such methods include
  providing a carbon-containing material to a reactor comprising a solvent;
  providing one or more of: an oxidizing or reducing solution, and a doping and/or intercalating agent to the reactor comprising the carbon-containing material to obtain a reaction mixture;
  heating the reaction mixture to a temperature and for a time period sufficient to obtain an intermediate material;
  further heating the intermediate material to a temperature and for a time period sufficient to obtain the carbon nanomaterial;
  providing the carbon nanomaterial and one or more of additives selected from a conductive agent, binder, and thickening agent, to a second solvent to obtain the slurry of the carbon nanomaterial;
  coating a surface of a substrate with the slurry to obtain a coated substrate; and
  heating the coated substrate to a temperature and for a time period sufficient to obtain the carbon nanomaterial film.

Another aspect of the disclosure provides methods for preparing a nanocomposite comprising the carbon nanomaterial of the disclosure as described herein. Such methods include
  providing a carbon-containing material to a reactor comprising a solvent;
  providing one or more of: an oxidizing or reducing solution, and a doping and/or intercalating agent to the reactor comprising the carbon-containing material to obtain a reaction mixture;
  heating the reaction mixture to a temperature and for a time period sufficient to obtain an intermediate material;
  further heating the intermediate material to a temperature and for a time period sufficient to obtain the carbon nanomaterial;
  providing the carbon nanomaterial to a polymer to obtain the nanocomposite.

Another aspect of the disclosure provides an electrochemical cell. Such cell includes a cathode comprising the carbon nanomaterial film of the disclosure as described herein, an anode, an electrolyte in fluid communication with the cathode and the anode, and a separator disposed between the anode and the cathode.

These and other features and advantages of the claimed invention will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The accompanying drawings are included to provide a further understanding of the compositions and methods of the disclosure and are incorporated in and constitute a part of this specification. The drawings illustrate one or more embodiment(s) of the disclosure and, together with the description, serve to explain the principles and operation of the disclosure.

FIG. 12 shows the process at 800° C. (100,000× magnification);

FIG. 13 shows the process at 900° C. (35,000× magnification);

FIG. 14 shows the process at 1000° C. (50,000× magnification);

FIG. 18A shows the test data at 0.1 C; FIG. 18B shows the test data at 0.1 C, 0.2 C, and 0.5 C; FIG. 18C shows the test data at 1 C, 5 C, and 10 C.

DETAILED DESCRIPTION OF THE DISCLOSURE

Figure 1:
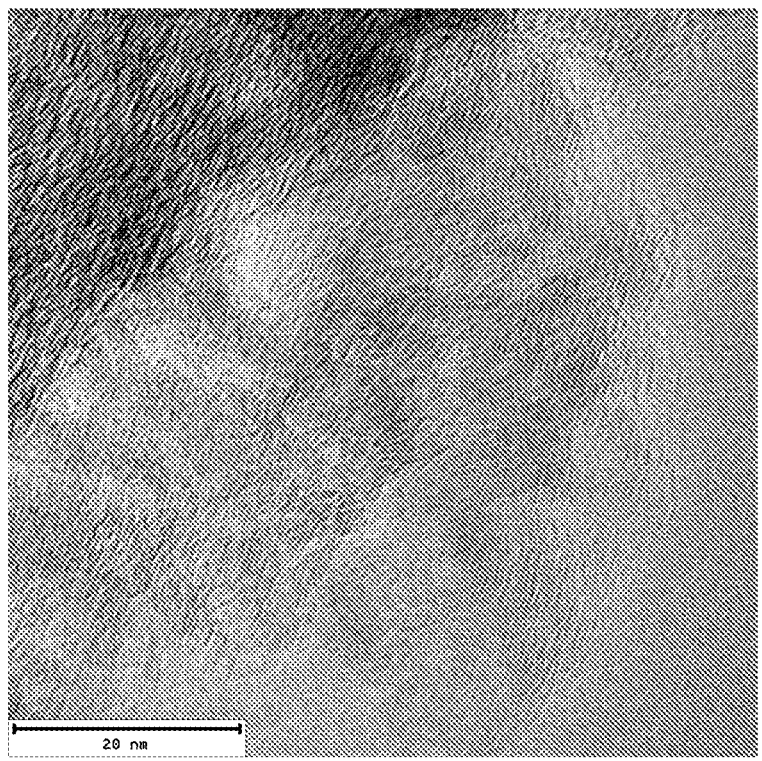
FIG. 1 and FIG. 2 show a transmission electron micrograph of the doped-graphene prepared from corn at 750° C. as disclosed in Example 1.

Before the disclosed processes and materials are described, it is to be understood that the aspects described herein are not limited to specific embodiments, and as such can, of course, vary. It is also to be understood that the terminology used herein is for the purpose of describing particular aspects only and, unless specifically defined herein, is not intended to be limiting.

In view of the present disclosure, the compositions and methods provide a doped and/or intercalated carbon nanomaterial that can be used for fabrication of advanced materials, including but not limited to, ultra-high energy storage devices, ultra-sensitive catalyst, high capacity and activity filters, composites and impact resistance devices. The methods of the disclosure can also be used to produce doped and/or intercalated carbon nanomaterial on various substrates or to produce nanocomposites comprising the doped and/or intercalated carbon nanomaterial.

As provided above, one aspect of the disclosure provides a process for preparing a doped and/or intercalated carbon nanomaterial of the disclosure. For example, the carbon nanomaterial may be Li-, Na-, O-, P-, K-, and/or Si-doped. In certain embodiments, the carbon material of the disclosure comprises up to 2 wt % of doping. In another example, the carbon nanomaterial may be in a form of a particulate, porous foam, film, or pellet, or is dispersed in a solvent.

In the process, a carbon-containing material is provided to a reactor comprising a solvent. In certain embodiments, the suitable carbon-containing material includes a carbon nanosheet, graphene, fullerene, amorphous carbon, graphene oxide, carbon black, activated carbon, charcoal, carbon nanotubes, graphite, coal, and a combination thereof. In certain embodiments, the suitable carbon-containing material includes is or is derived from the group consisting of cassava root, tapioca flour, yam root, potato root, sugarcane, sugar beet, sucrose, rice grain, corn, and wheat grain. For example, the carbon-containing material comprises cassava root extract, cassava root flour, tapioca flour, dried cassava root pulp, dried and fried cassava root flakes, yam root extract, or potato root extract. In certain embodiments, the carbon-containing material comprises sugarcane extract, sugar beet root extract, or sucrose. In certain embodiments, the carbon-containing material comprises rice grain or corn or wheat grain.

The solvent suitable for the process of the disclosure as described herein includes, but is not limited to, distilled water, deionized water, ethanol, N-methyl-2-pyrrolidone (NMP), ethylene glycol, propylene glycol, or a combination thereof. The solvent may soak or dissolve (fully or partially) the carbon-containing material.

To the reactor comprising the carbon-containing material and the solvent, to obtain a reaction mixture, one or more of: an oxidizing or reducing solution, and a doping and/or intercalating agent is provided. In certain embodiments, the oxidizing or reducing solution is selected from one or more of: sodium hydroxide, potassium hydroxide, hydrochloric acid, phosphoric acid, phosphorous acid, and nitric acid. In certain embodiments, the oxidizing or reducing solution is phosphoric acid (e.g., 75%) or sodium hydroxide (e.g., 5%).

The doping and/or intercalating agent suitable for use in the methods of the disclosure includes organic or inorganic salts of lithium, sodium, potassium, magnesium, calcium, aluminum, and silicon. For example, in certain embodiments, the doping and/or intercalating agent of the disclosure is selected from lithium chloride, 3,4-dihydroxybenzonitrile dilithium, lithium hydroxide, lithium acetate, lithium citrate, lithium bis(trifluoromethylsulfonyl)imide, lithium hexafluorophosphate, aluminium triacetate, calcium hydroxide, magnesium acetate, silicon oxide, and a combination thereof. In certain embodiments, the doping and/or intercalating agent is lithium acetate, lithium hydroxide, or silicon oxide. In certain embodiments, the doping and/or intercalating agent is lithium acetate or lithium hydroxide, As provided above, in the process of the disclosure, the reaction mixture (e.g., comprising the carbon-containing material and one or more of: an oxidizing or reducing solution and a doping and/or intercalating agent in the solvent) is heated to a temperature and for a time period sufficient to obtain an intermediate material. Heating in the process of the disclosure may be accomplished by any suitable means known to those of skill in the art, such as by using resistive element source, laser irradiation, microwave irradiation, etc.

In certain embodiments, the reactor is charged with partial oxygen or inert gas (such as argon, helium, or nitrogen) prior to heating. In certain embodiments, the reactor is charged with a partial pressure of hydrogen gas in an inert gas (such as argon, helium, or nitrogen).

The temperature sufficient to obtain the intermediate material, in certain embodiments, is in a range of about 45 to 1050° C. For example, the reaction mixture may be heated to a temperature in a range of about 50 to 200° C., 60 to 200° C., 70 to 200° C., 100 to 200° C., 50 to 150° C., 60 to 150° C., 70 to 150° C., 100 to 150° C., 50 to 120° C., 60 to 120° C., 70 to 120° C., or 100 to 120° C. The time sufficient to obtain the intermediate material, in certain embodiments, is in a range of about 1 hour to 36 hours. For example, the reaction mixture may be heated for a time in a range of about 6 to 36 hours, 6 to 24 hours, 6 to 18 hours, 6 to 12 hours, 12 to 36 hours, 12 to 24 hours, 12 to 18 hours, 18 to 30 hours, 20 to 28 hours, 22 to 26 hours, or 24 to 36 hours. In certain embodiments, the reaction is heated for about 24 hours.

After forming the intermediate material, in certain embodiments, the reducing or oxidizing solution and/or the doping and/or intercalating agent may be removed from the mixture by any suitable means known to those of skill in the art. For example, the reducing or oxidizing solution may be removed by filtering, or by washing and diluting with excess distilled or deionized water. The doping and/or intercalating agent may be removed by washing, filtering, magnetic separation, sonication, sieving, and centrifugation.

The intermediate material may also be dried prior to further heating in order to obtain the carbon nanomaterial.

In certain embodiments, the intermediate material may be contacted with one or more of the doping and/or intercalating agents prior to further heating. In some embodiments, the doping and/or intercalating agent is not provided to the reactor to form the reaction mixture (e.g., the reaction mixture comprising the carbon-containing material and one or more of an oxidizing or reducing solution in the solvent), and the intermediate material may be contacted with one or more of the doping and/or intercalating agents prior to further heating.

In certain embodiments, the intermediate material may be contacted with one or more of hydrazine ($N_2H_4$), lithium aluminium hydride ($LiAlH_4$), diborane ($B_2H_6$), and sodium borohydride ($NaBH_4$) prior to further heating. In such process, a network of doped and/or intercalated carbon material in form of a nanosheet or foam is produced.

In the process of the disclosure as described herein, the intermediate material is further heated to a temperature and for a time period sufficient to obtain the carbon nanomaterial. For example, the intermediate material may be heated to a temperature in a range of about 500 to 1500° C., such as 600 to 1500° C., 700 to 1500° C., 800 to 1500° C., 900 to 1500° C., 500 to 1000° C., 600 to 1000° C., 700 to 1000° C., 800 to 1000° C., 900 to 1000° C., or 1000 to 1500° C.

The time sufficient to obtain the intermediate material, in certain embodiments, is in a range of about 10 minutes to 3 hours. For example, the reaction mixture may be heated for a time in a range of about 0.5 to 3 hours, 0.5 to 2 hours, 0.5 to 1.5 hours, 0.5 to 1 hour, 0.75 to 1.25 hours, 1 to 3 hours, 1 to 2 hours, or 2 to 3 hours, or about 1 hour.

In certain embodiments, the carbon nanomaterial may be further processed in order to obtain carbon nanomaterial having high surface area, such as a BET surface area of at least 1900 $m^2/g$ and pore volume of at least 2.4 $cm^3/g$. Thus, in certain embodiments, the process of the disclosure further comprises:

washing the carbon nanomaterial with hydrogen peroxide or hydrochloric acid to obtain a washed carbon nanomaterial;

rising the washed carbon nanomaterial with distilled or deionized water to obtain a rinsed carbon nanomaterial; and heating the rinsed carbon nanomaterial in an third gas at a temperature in a range of about 700 to 1500° C.

The third gas, in certain embodiments, comprises partial oxygen or an inert gas (e.g., argon, helium or nitrogen). In certain embodiments, the inter gas further comprises a partial pressure of hydrogen gas.

In certain embodiments, the carbon nanomaterial has a BET surface area of at least 1900 $m^2/g$, such as for example, at least 2000 $m^2/g$, 2100 $m^2/g$, 2200 $m^2/g$, 2300 $m^2/g$, and even 2400 $m^2/g$. In certain embodiments, the carbon nanomaterial has a BET surface area of up to 2700 $m^2/g$. In certain embodiments, the carbon nanomaterial has a pore volume of at least 2.4 $cm^3/g$, such as for example, at least 2.5 $cm^3/g$, 2.8 $cm^3/g$, 3 $cm^3/g$, 3.2 $cm^3/g$, 3.4 $cm^3/g$, 3.6 $cm^3/g$, 3.9 $cm^3/g$, 4 $cm^3/g$, 4.5 $cm^3/g$, or even 4 $cm^3/g$. In certain embodiments, the carbon nanomaterial has a pore volume of up to 6 $cm^3/g$, e.g., up to 5.5 $cm^3/g$ or up to 5 $cm^3/g$.

The carbon nanomaterial of the disclosure as described herein may be also mixed with one or more additives in a second solvent in order to obtain a slurry. The second solvent and the one or more additives, such as conductive agents, binders, and thickening agents, may be selected by one of skill in the art depending on the desired application.

Furthermore, in certain embodiments, the carbon nanomaterial of the disclosure as described herein may be used to provide a carbon nanomaterial film. The carbon nanomaterial film of the disclosure configured for use in an electrochemical cell. Thus one aspect of the disclosure provides a process for preparing the carbon nanomaterial film, the process including:

providing the carbon nanomaterial prepared by the process of the disclosure as described herein and one or more of additives selected from a conductive agent, binder, and thickening agent, to a second solvent to obtain the slurry of the carbon nanomaterial;

coating a surface of a substrate with the slurry to obtain a coated substrate; and heating the coated substrate to a temperature and for a time period sufficient to obtain the carbon nanomaterial film.

Suitable substrates may be coated by tape casting, dip coating, spray coating, spin coating, electronic printing, lamination, stamping, block printing, roller printing, screen printing, and heat transfer printing.

For example, in certain embodiments, the coated substrate may be heated to a temperature in a range of about 25 to 150° C.

The heating, in certain embodiments, may be under partial oxygen or an inert gas (e.g., argon, helium or nitrogen)

atmosphere. In certain embodiments, the inter gas further comprises a partial pressure of hydrogen gas.

One of skill in the art will recognize that a substrate surface may be prepared for the coating step. For example, in certain embodiments, the substrate surface is cleaned with organic solvent and/or acid or base, rinsed with distilled or deionized water, and dried prior to coating.

Another aspect of the disclosure provides a nanocomposite comprising a carbon nanomaterial of the disclosure and a polymer. The disclosure also provides a process for preparing the nanocomposite, comprising providing the carbon nanomaterial of the disclosure to a polymer.

Suitable polymers include, but are not limited to, high density polyethylene and polypropylene, rubber, nylon, epoxy, teflon, and adhesives.

In certain embodiments, the carbon nanomaterial is provided in an amount sufficient to increase one or more of mechanical, absorption, adsorption, electrical, electronic, magnetic, and optical properties of the nanocomposite by at least a factor greater than 1 compared to the same properties of the polymer. For example, the carbon nanomaterial is provided in an amount in a range of 0.001 to 40 weight %, based on the combined weight of the carbon nanomaterial and the polymer. In certain embodiments, the carbon nanomaterial is provided in an amount in a range of 0.01 to 5 weight % (e.g., 0.01 to 4 weight %, 0.01 to 2 weight %, 0.01 to 1 weight %, 0.1 to 5 weight %, 0.1 to 4 weight %, 0.1 to 2 weight %, 0.1 to 1 weight %, 1 to 5 weight %, 1 to 4 weight %, 1 to 2 weight %, 0.5 to 1 weight %, 2 to 5 weight %, 2 to 4 weight %, 3 to 5 weight %, or 4 to 5 weight %), based on the combined weight of the carbon nanomaterial and the polymer.

Another aspect of the disclosure provides an electrochemical cell comprising: a cathode comprising carbon nanomaterial film of the disclosure, an anode, an electrolyte in fluid communication with the cathode and the anode, and a separator disposed between the anode and the cathode. In certain embodiments, the anode is high energy and high power density anode. In certain embodiments, the electrolyte consist of a combination of organic or inorganic solvents containing lithium compounds, sodium compounds, potassium compounds, or calcium compounds, such as 3,4-dihydroxybenzonitrile dilithium, lithium hydroxide, lithium acetate, lithium citrate, lithium bis(trifluoromethylsulfonyl)imide (LiTFSI), or lithium hexafluorophosphate (LiPF$_6$).

In certain embodiments, the electrochemical cell of the disclosure is configured as a coin cell, a pouch cell, a cylindrical cell form-factor, or a pack comprising two or more of the coin cells, pouch cells, or cylindrical cell form-factors.

EXAMPLES

The compositions and methods of the disclosure are illustrated further by the following examples, which is not to be construed as limiting the disclosure in scope or spirit to the specific procedures and compounds described therein.

Example 1: Preparation of Doped Carbon Nanosheet from Corn

Figure 2:
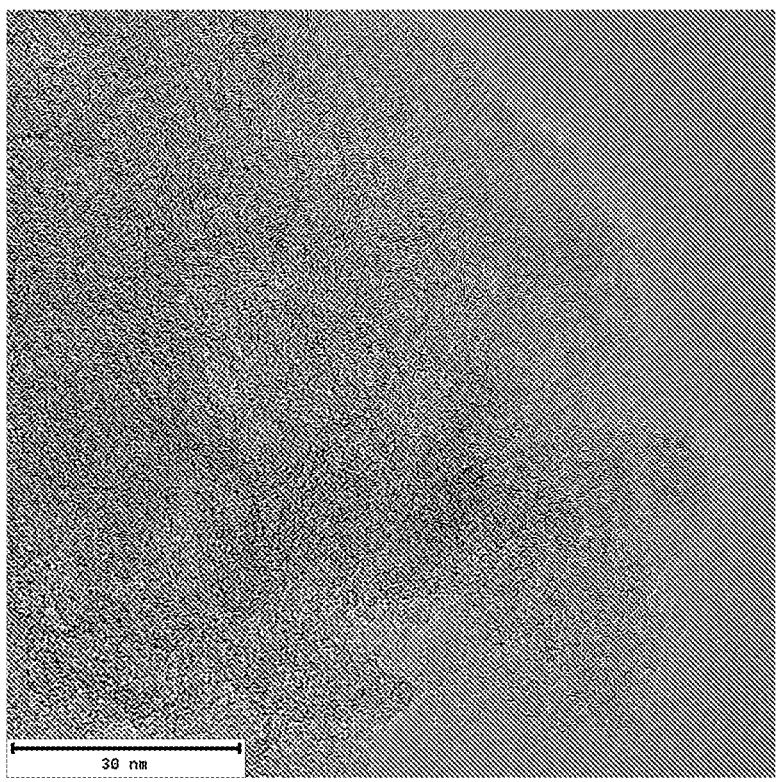
Figure 3:
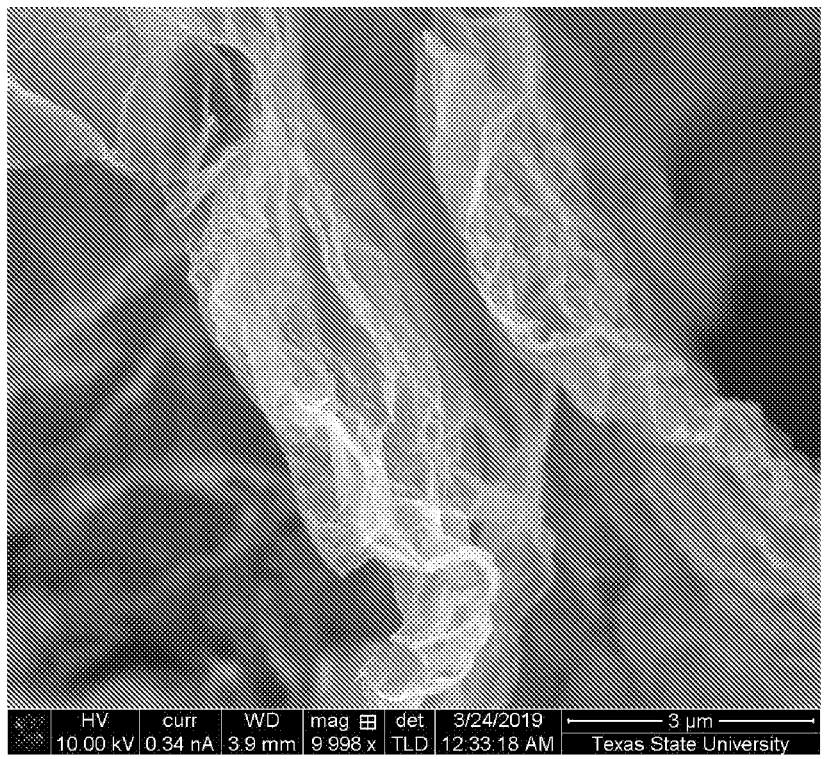
FIG. 3 shows scanning electron micrographs (10,000× magnification) of doped-graphene sheets prepared as disclosed in Example 1.
Figure 4:
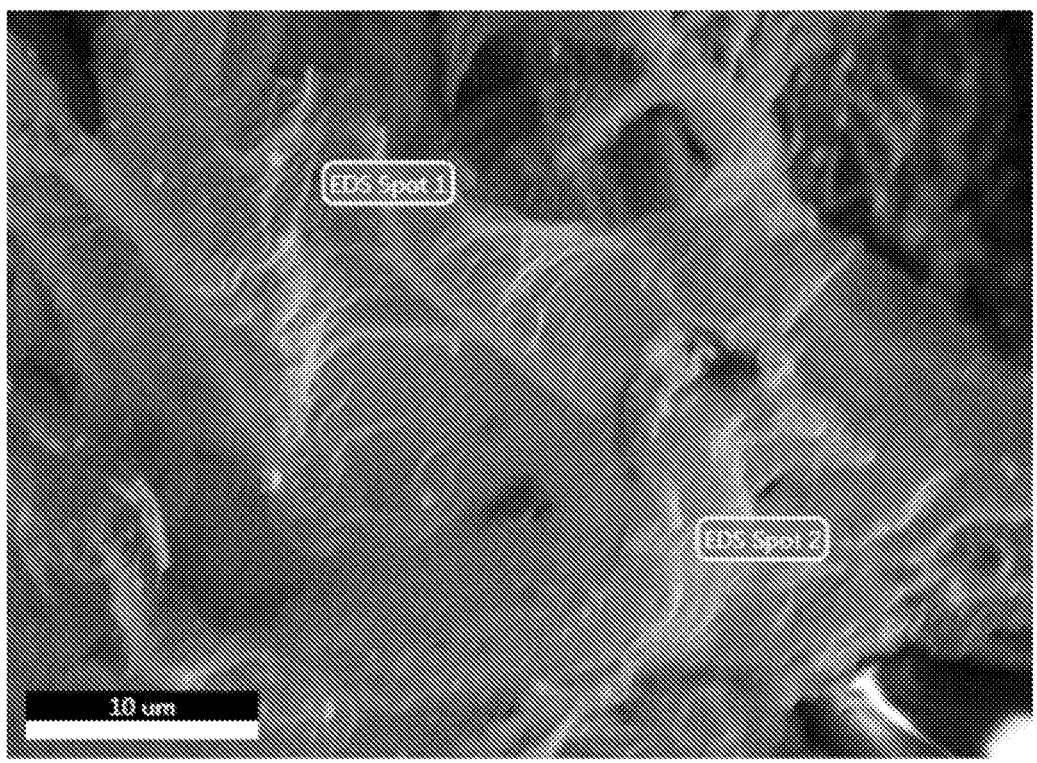
FIG. 4 shows scanning electron micrograph of doped-graphene prepared as disclosed in Example 1, with two testing spots

A total of 20.0 g of corn grain was placed in a 500 mL Pyrex glass beaker. About 5 g of lithium acetate was dissolved in 100 mL solution and was added to the corn grains in beaker, and the resulting mixture was stirred thoroughly. 80.0 g of phosphoric acid was added to the mixture and exposed to 160° C. for 36 hours in a convection oven in air atmosphere. After heating, the sample formed an intermediate product, which was exposed to further heating on 750° C. in 10% vol. H$_2$ in He gas flowing at a total rate of 100 mL/min. The sample was ramped at 10° C./min from 20° C. to 750° C. and held at 750° C. for 1 hour. The resulting product was washed thoroughly in de-ionized water to remove any unreacted precursors, followed by drying in an oven at 80° C. overnight. Transmission electron micrographs showed in FIGS. 1 and 2 confirmed the final product is made-up of predominantly carbon nanosheets. Scanning electron micrographs of resulting doped-nanosheet are presented in FIGS. 3 and 4. The elemental compositions of the doped-carbon nanosheets performed using energy dispersive spectroscopy (EDS) technique is provided in Table 1 where the sampling was performed in two locations indicated in FIG. 4.

TABLE 1

| EDS location | Element | Weight % | Atomic % | Net Int. | Error % | K ratio |
|---|---|---|---|---|---|---|
| Spot 1 | C K | 97.73 | 99.07 | 820.61 | 3.60 | 0.8682 |
|  | O K | 0.11 | 0.08 | 0.43 | 99.99 | 0.0003 |
|  | P K | 2.16 | 0.85 | 15.48 | 13.04 | 0.0175 |
| Spot 2 | C K | 91.50 | 93.97 | 2293.33 | 2.85 | 0.8750 |
|  | O K | 7.35 | 5.67 | 76.64 | 12.37 | 0.0175 |
|  | K K | 1.15 | 0.36 | 17.83 | 19.52 | 0.0094 |

Example 2: Preparation of Phosphorus and Silicon Doped Carbon Nanosheet from Rice Grain A total of 400 g of rice grain was washed thoroughly in 2000 mL of deionized water. The rice grain was filtrated and added to 1000 mL of phosphoric acid, and stirred thoroughly. The mixture was exposed to 160° C. for 24 hours in a convection oven in air atmosphere to form intermediate mixture.

A sample size of 100 g of intermediate mixture was put in a quartz combustion boat and placed inside quartz tube for heat treatment. The intermediate sample was ramped at 10° C./min from 10° C. to 1000° C. and held at 1000° C. for 1 hour. The thermal treatment was carried out in a gas mixture containing 80 vol % argon and 20 vol % hydrogen gas, flowing at a total rate of 1000 L/min. The scanning electron micrographs of the final solid product are presented in FIGS. 5 and 6. The elemental compositions of the doped-carbon nanosheets is provided in Table 2 where the sampling was performed in two locations indicated in FIGS. 5 and 6. In addition, as presented in Table 3, the gas adsorption shows the specific surface area measurement data of the final product of 2625 m$^2$/g and pore volume of 5.1 cc/g.

TABLE 2

Figure 5:
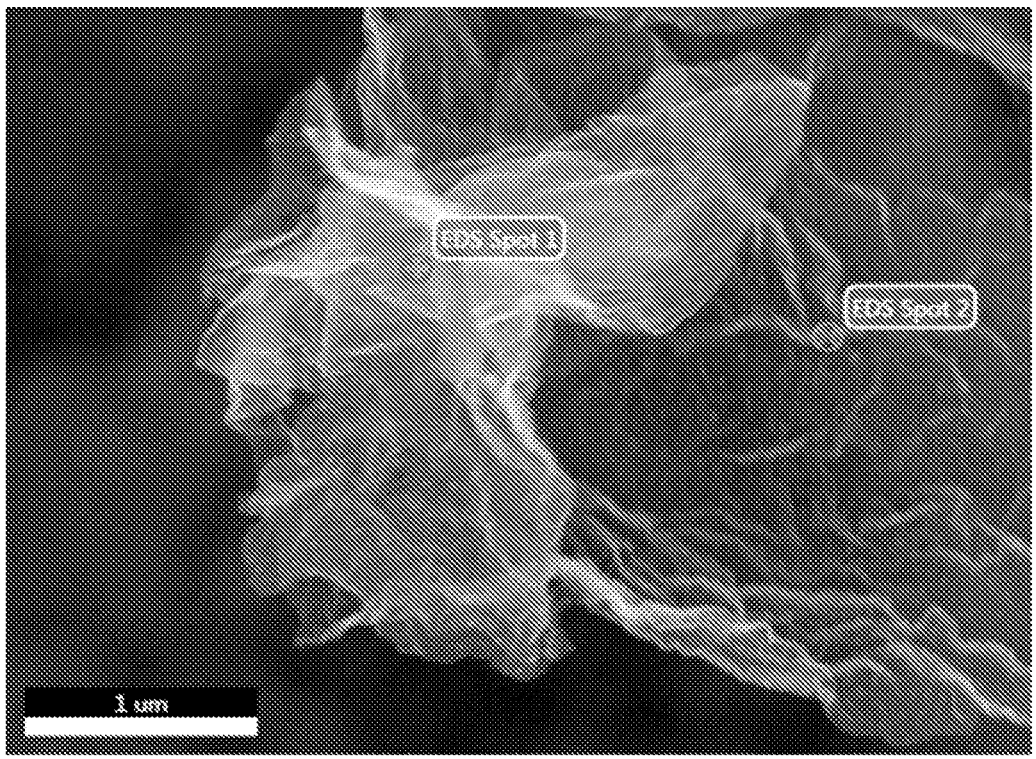
FIG. 5 and FIG. 6 show a scanning electron micrograph showing doped-graphene prepared from rice grain at 1000° C. as disclosed in Example 2.

| EDS location | Element | Weight % | Atomic % | Net Int. | Error % | K ratio |
|---|---|---|---|---|---|---|
| Spot 1, FIG. 5 | C K | 88.76 | 92.20 | 1665.51 | 4.14 | 0.7232 |
|  | O K | 8.64 | 6.74 | 81.57 | 12.08 | 0.0211 |
|  | SiK | 0.35 | 0.16 | 11.86 | 20.66 | 0.0029 |
|  | P K | 2.25 | 0.91 | 56.84 | 7.32 | 0.0183 |
| Spot 2, FIG. 5 | C K | 88.81 | 92.29 | 1610.56 | 4.21 | 0.7178 |
|  | O K | 8.43 | 6.58 | 77.46 | 12.12 | 0.0206 |
|  | SiK | 0.36 | 0.16 | 11.61 | 20.63 | 0.0030 |
|  | P K | 2.40 | 0.97 | 59.22 | 7.05 | 0.0195 |

TABLE 2-continued

Figure 6:
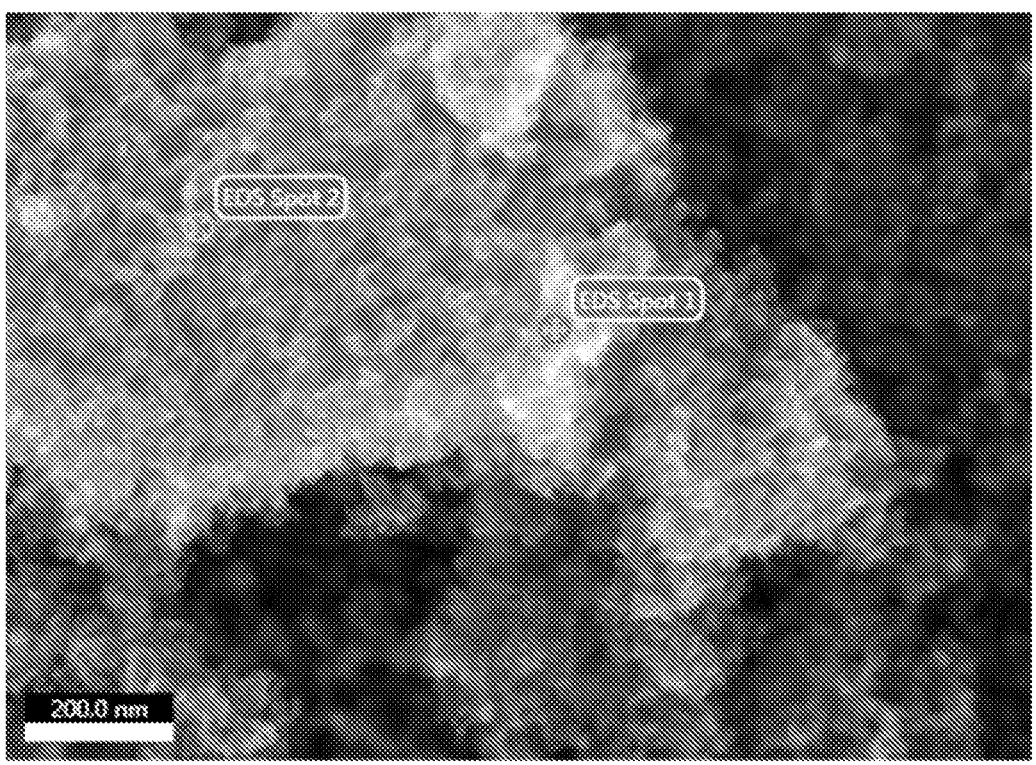

| EDS location | Element | Weight % | Atomic % | Net Int. | Error % | K ratio |
|---|---|---|---|---|---|---|
| Spot 1, FIG. 6 | C K | 88.76 | 92.20 | 1665.51 | 4.14 | 0.7232 |
| | O K | 8.64 | 6.74 | 81.57 | 12.08 | 0.0211 |
| | SiK | 0.35 | 0.16 | 11.86 | 20.66 | 0.0029 |
| | P K | 2.25 | 0.91 | 56.84 | 7.32 | 0.0183 |
| Spot 2, FIG. 6 | C K | 88.81 | 92.29 | 1610.56 | 4.21 | 0.7178 |
| | O K | 8.43 | 6.58 | 77.46 | 12.12 | 0.0206 |
| | SiK | 0.36 | 0.16 | 11.61 | 20.63 | 0.0030 |
| | P K | 2.40 | 0.97 | 59.22 | 7.05 | 0.0195 |

TABLE 3

| | Measured property | Measured Value |
|---|---|---|
| Surface Area (m²/g) | Single point surface area at P/Po = 0.200004002 | 2572.6885 |
| | BET Surface Area | 2625.1389 |
| | Langmuir Surface Area | 6046.6273 |
| | t-Plot Micropore Area | 162.4709 |
| | t-Plot External Surface Area | 2462.6680 |
| | BJH Adsorption cumulative surface area of pore between 17.000 Å and 3000.000 Å width | 2831.605 |
| Pore Volume (cm³/g) | Single point adsorption total pore volume of pores less than 0.000 Å width at P/Po = 1.000675745 | 5.112336 |
| | t-Plot micropore volume | 0.065579 |
| | BJH Adsorption cumulative volume of pores between 17.000 Å and 3000.000 Å width | 5.291191 |
| Pore Size (Å) | Adsorption average pore width (4 V/A by BET) | 77.8981 |
| | BJH Adsorption average pore width (4 V/A) | 74.745 |
| DFT Pore Size | Volume in Pores <18.09 Å (cm³/g) | 0.48551 |
| | Total Volume in Pores ≤387.34 Å (cm³/g) | 3.58323 |
| | Area in Pores >387.34 Å (m²/g) | 0.000 |
| | Total Area in Pores ≥18.09 Å (m²/g) | 1015.889 |
| DFT Surface Energy (m²/g) | Total Area | 2573.750 |
| Nanoparticle Size (Å) | Average Particle Size | 22.856 |
| Horvath-Kawazoe | Maximum pore volume at P/Po = 0.983722082 (cm³/g) | 5.047021 |
| | Median pore width (Å) | 149.175 |

Example 3: Preparation of Multi-Element Doping of Carbon Nanosheet

Figure 7:
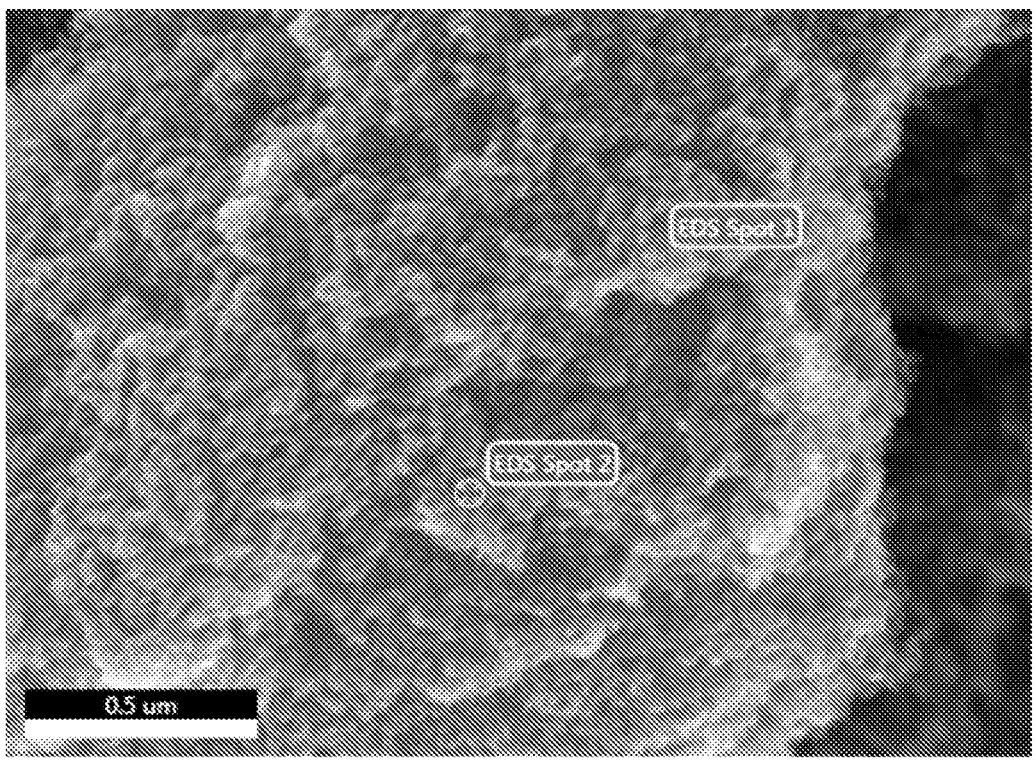
FIG. 7 shows a scanning electron micrograph of the doped-graphene prepared from cassava at 1000° C. as disclosed in Example 3.

A total of 300 g of cassava extract was placed in a 2000 mL Pyrex glass beaker. About 50.0 g of potassium hydroxide was dissolved in a 1000 mL of deionized water and stirred thoroughly. Then, the cassava extract was added to the solution. This mixture sat for 6 hours and the soaked cassava extract was filtered out to remove excess solution. About 100 g of phosphorous acid was added to the filtered cassava extract and exposed to rapid and uniform heating for 10 minutes by using microwave irradiation (1000 W). The intermediate sample was ramped at 15° C./min from 20° C. to 1000° C. and held at 1000° C. for 1 hour. The thermal treatment was carried out in a gas mixture containing 90 vol % argon and 10 vol % hydrogen gas, flowing at a total rate of 1000 L/min. The scanning electron micrograph of the final solid product is presented in FIG. 7, and the elemental compositions of the doped-carbon nanosheets is provided in Table 4 where the sampling was performed in two locations indicated in FIG. 7.

TABLE 4

| EDS location | Element | Weight % | Atomic % | Net Int. | Error % | K ratio |
|---|---|---|---|---|---|---|
| Spot 1 | C K | 81.60 | 90.76 | 1049.06 | 6.15 | 0.5566 |
| | O K | 4.33 | 3.61 | 34.95 | 32.06 | 0.0115 |
| | MgK | 0.85 | 0.46 | 18.41 | 14.93 | 0.0066 |
| | AlK | 0.55 | 0.27 | 11.46 | 21.84 | 0.0044 |
| | SiK | 0.86 | 0.41 | 17.32 | 15.54 | 0.0073 |
| | P K | 5.31 | 2.29 | 77.12 | 6.83 | 0.0437 |
| | K | 1.98 | 0.68 | 15.22 | 15.83 | 0.0163 |
| | CaK | 4.53 | 1.51 | 26.11 | 14.38 | 0.0369 |
| Spot 2 | C K | 78.72 | 88.79 | 968.56 | 6.41 | 0.5201 |
| | O K | 5.94 | 5.03 | 48.14 | 24.89 | 0.0161 |
| | MgK | 0.88 | 0.49 | 18.95 | 14.13 | 0.0069 |
| | AlK | 0.26 | 0.13 | 5.45 | 40.06 | 0.0021 |
| | SiK | 1.00 | 0.48 | 19.93 | 12.94 | 0.0085 |
| | P K | 5.91 | 2.59 | 85.08 | 6.33 | 0.0488 |
| | K | 2.37 | 0.82 | 18.02 | 13.84 | 0.0196 |
| | CaK | 4.91 | 1.66 | 28.04 | 13.20 | 0.0401 |

Figure 8:
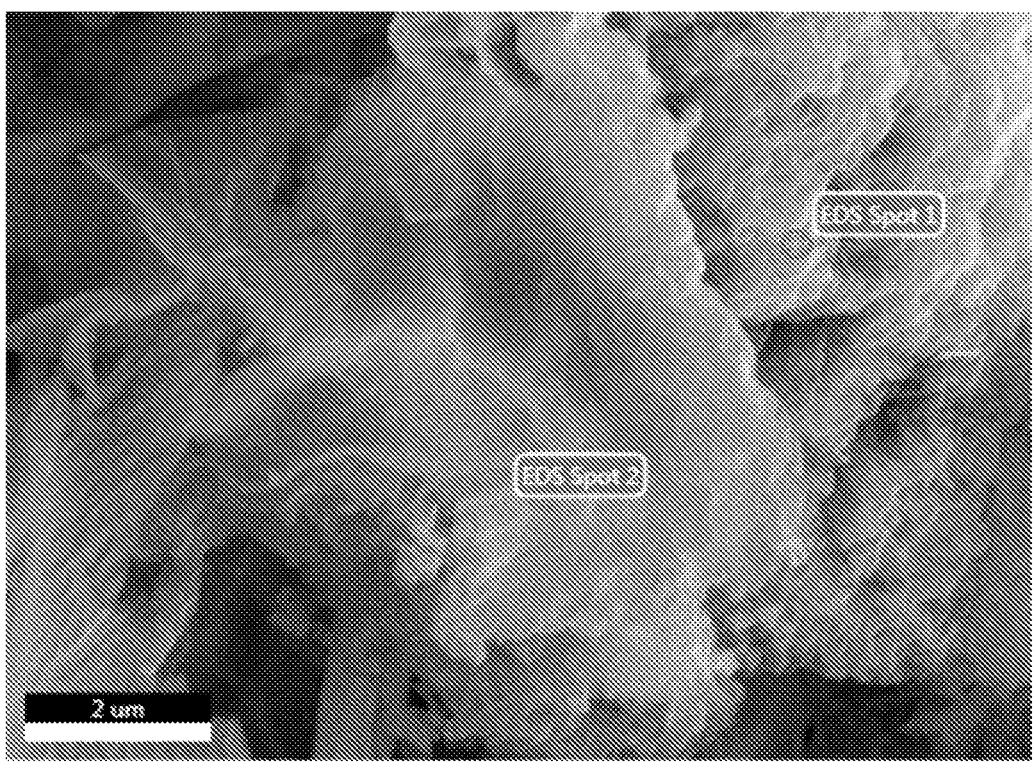
FIG. 8 shows a scanning electron micrograph of the doped-graphene prepared from rice grain at 850° C. as disclosed in Example 4.

Example 4: Preparation of Multi-Element Doping of Carbon Nanosheet from Rice Grain A total of 60 g of rice grain was added to 180 g of phosphoric acid, and stirred thoroughly. The mixture was exposed to 160° C. for 3 hours in a convection oven in air atmosphere to form intermediate mixture. The resulting product was soaked in 400 mL solution containing at least one of; lithium acetate, sodium hydroxide, aluminium triacetate, calcium hydroxide, potassium hydroxide, magnesium acetate. This mixture sat for 6 hours and the soaked product was filtered out to remove the excess solution, followed by second heat treatment in inert atmosphere at 850° C. for 3 hours. The scanning electron micrograph of the final solid product is presented in FIG. 8, and the elemental compositions of the doped-carbon nanosheets is provided in Table 5 where the sampling was performed in two locations indicated in FIG. 8.

TABLE 5

| EDS location | Element | Weight % | Atomic % | Net Int. | Error % | K ratio |
|---|---|---|---|---|---|---|
| Spot 1 | C K | 73.57 | 82.50 | 1393.70 | 6.38 | 0.4764 |
| | O K | 15.17 | 12.77 | 217.26 | 13.25 | 0.0462 |
| | NaK | 0.53 | 0.31 | 13.40 | 19.69 | 0.0035 |
| | MgK | 0.60 | 0.33 | 19.86 | 15.26 | 0.0046 |
| | P K | 6.75 | 2.93 | 151.77 | 5.00 | 0.0555 |
| | K | 2.37 | 0.81 | 27.66 | 11.52 | 0.0191 |
| | CaK | 1.02 | 0.34 | 9.17 | 26.24 | 0.0084 |
| Spot 2 | C K | 63.68 | 74.47 | 898.44 | 7.32 | 0.3660 |
| | O K | 21.93 | 19.26 | 285.64 | 10.36 | 0.0724 |
| | NaK | 0.36 | 0.22 | 7.53 | 27.18 | 0.0024 |
| | MgK | 0.78 | 0.45 | 21.69 | 12.87 | 0.0060 |
| | SiK | 0.38 | 0.19 | 9.88 | 19.78 | 0.0032 |
| | P K | 8.54 | 3.87 | 161.84 | 4.94 | 0.0705 |
| | K | 2.38 | 0.86 | 23.60 | 12.49 | 0.0194 |
| | CaK | 1.94 | 0.68 | 14.68 | 17.82 | 0.0160 |

Example 5

Figure 9:
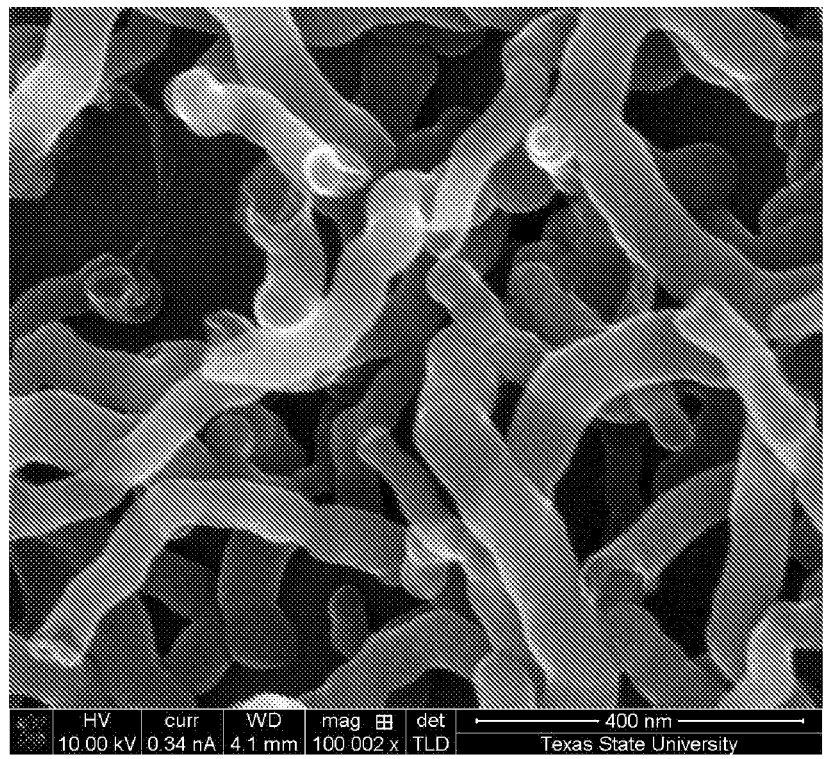
FIGS. 9-11 show scanning electron micrographs of wrapped-nanosheets formed from pyrolysis of cassava extract (FIG. 9, 100,002× magnification), rice grain (FIG. 10, 80,000× magnification) and corn (FIG. 11, 65,000× magnification) as disclosed in Example 5.
Figure 10:
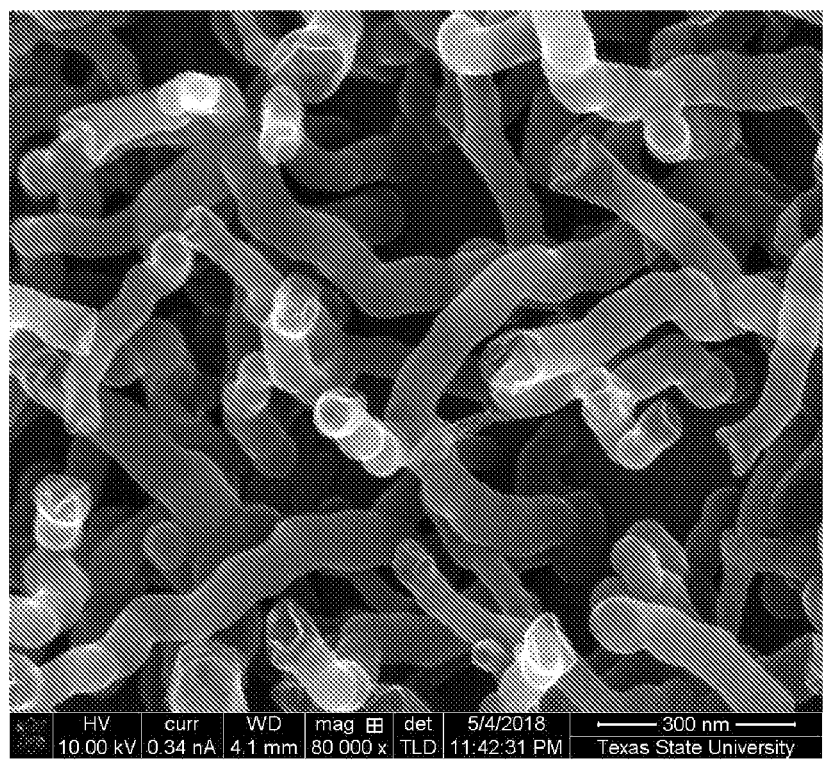
Figure 11:
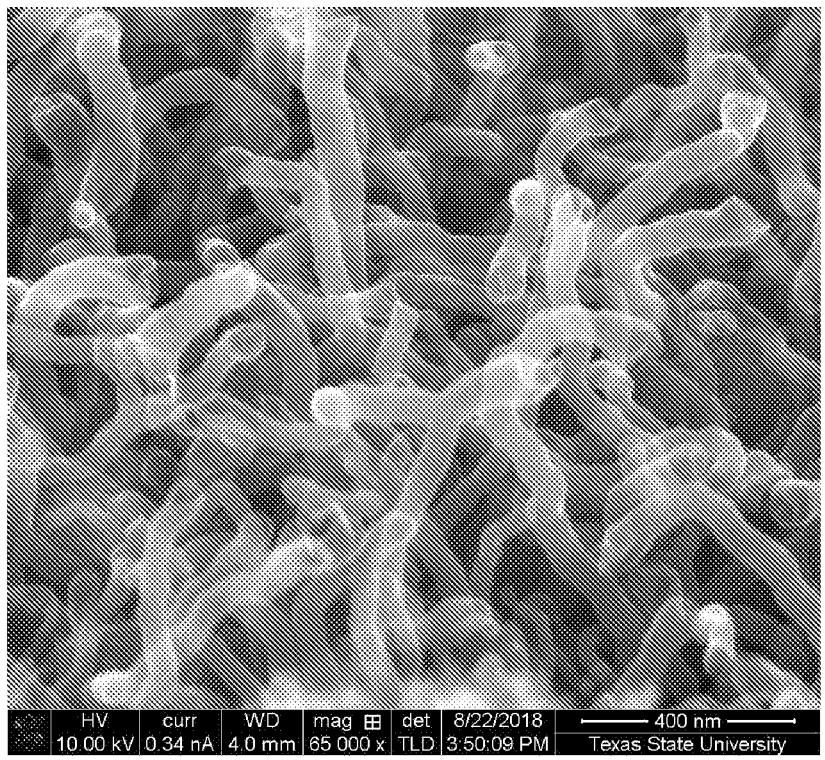

Doped carbon nanosheets with different morphologies were grown from cassava extract, rice grain, or corn grain. Representative procedure is as follows: about 150 g of cassava extract was soaked in 500 mL solution containing silicon oxide. This mixture sat for 6 hours and the soaked cassava extract was filtered out to remove excess solution. The soaked cassava extract was heated slowly from room temperature at a rate of 15° C./min to 1000° C. in a reducing atmosphere comprised of 10% hydrogen gas flowing at 100 ml/min. The sample was held at 1000° C. for 1 hour in reducing atmosphere, then cooled down to room temperature under inert atmosphere. FIGS. 9, 10, and 11 show SEM images of wrapped-nanosheets formed from pyrolysis of cassava extract, rice grain, and corn, respectively.

Example 6

Figure 12:
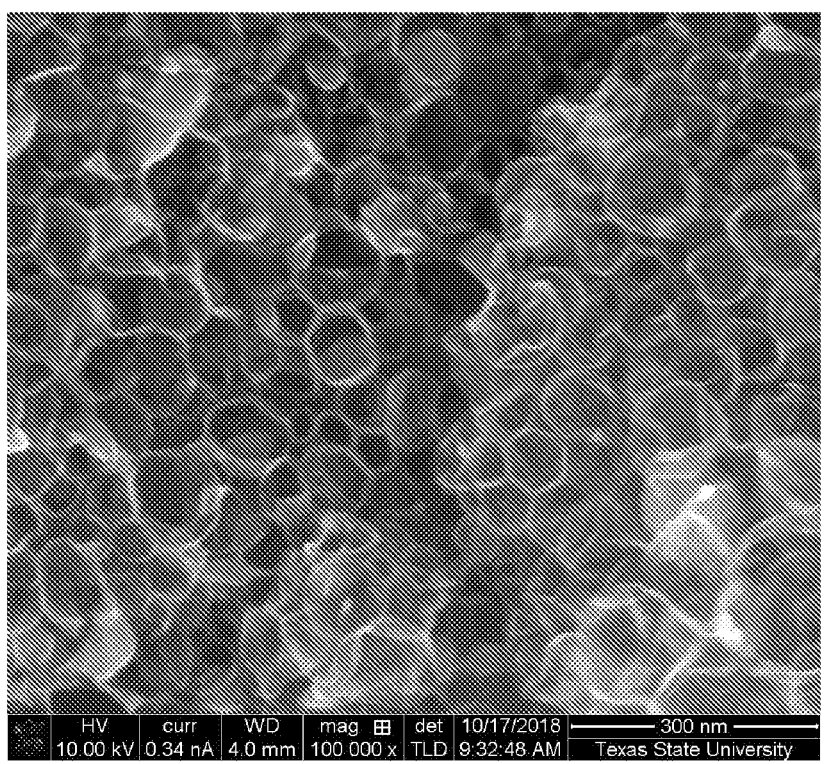
FIGS. 12-14 show scanning electron micrographs of wrapped-graphene sheets grown from corn husk at different temperatures as disclosed in Example 6.
Figure 13:
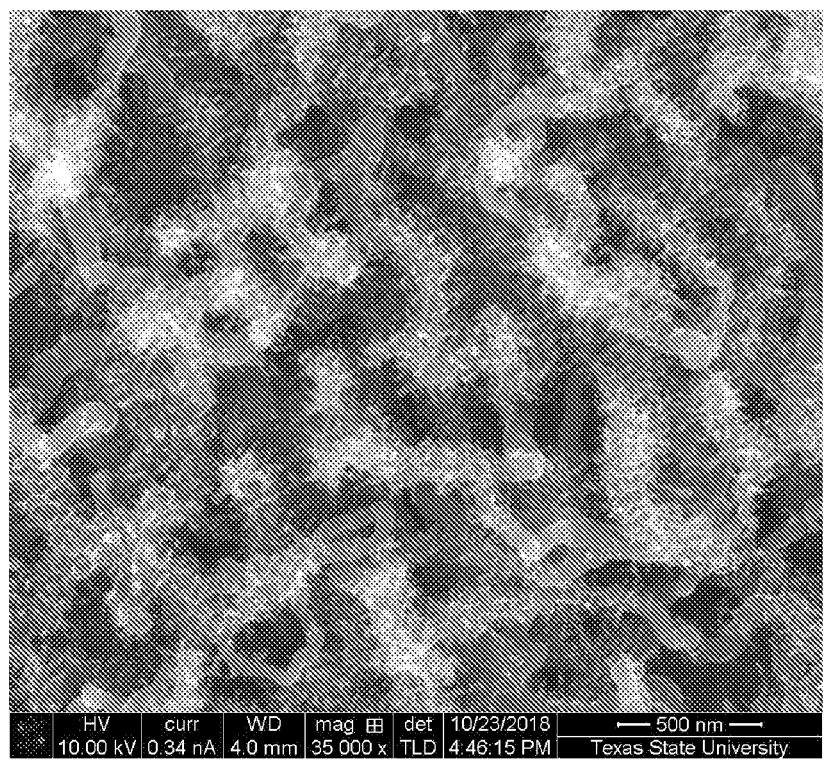
Figure 14:
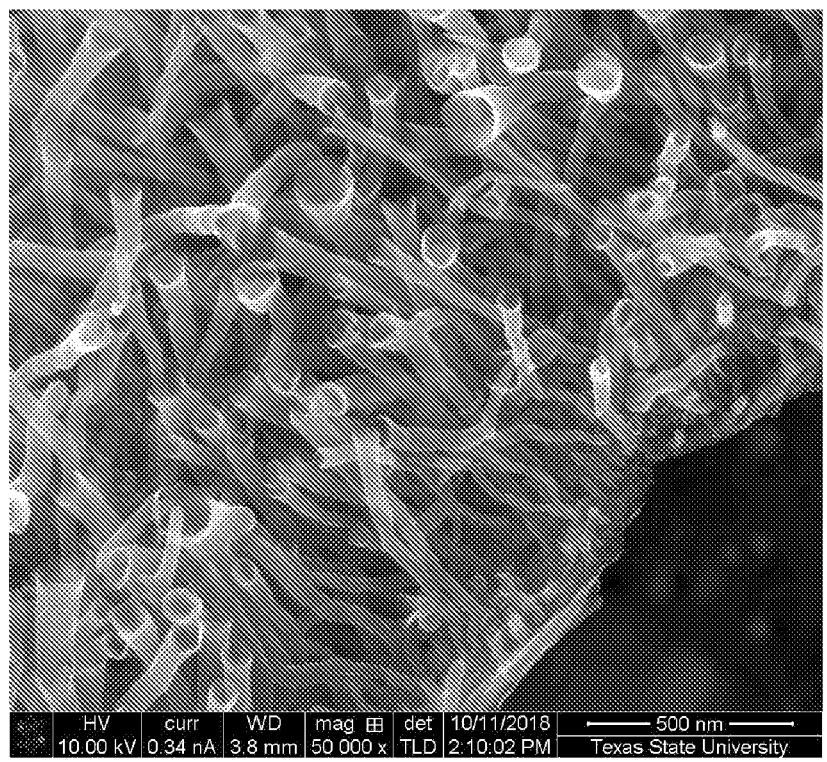
Figure 15:
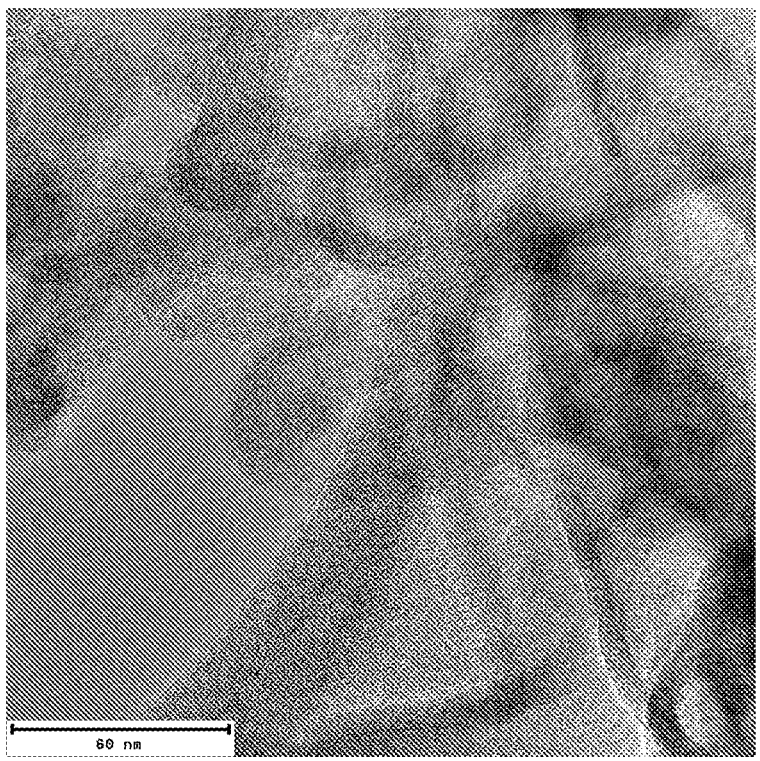
FIG. 15 shows a transmission electron micrograph of the wrapped-graphene prepared from corn husk at 1000° C. as disclosed in Example 6.

About 20 g of corn grain was washed with 100 mL of potassium hydroxide solution (5% concentration). The soaked corn grains filtered and was heated slowly from room temperature at a rate of 15° C./min to 800° C. in a reducing atmosphere comprised of 100% hydrogen gas flowing at 100 ml/min. The sample was held at 800° C. for 1 hour in reducing atmosphere, then cooled down to room temperature under inert atmosphere. FIG. 12 shows an electron micrograph of the resulting wrapped graphene sheet-like structure mixed with bulk sheets substrate. Specifically, when corn was prepared at 800° C., the SEM image revealed a fullerene-like morphology. When the temperature was increased to 900° C., the micrograph, FIG. 13 showed formation of small wrapped-graphene sheets grafted on larger wrapped-graphene sheets. When pyrolysis was carried out at 1000° C., only wrapped-graphene sheets with a hurricane shape was observed as shown in FIG. 14. FIG. 15 shows a transmission electron micrograph of the resulting wrapped graphene sheet-like structure.

Example 7

Figure 16:
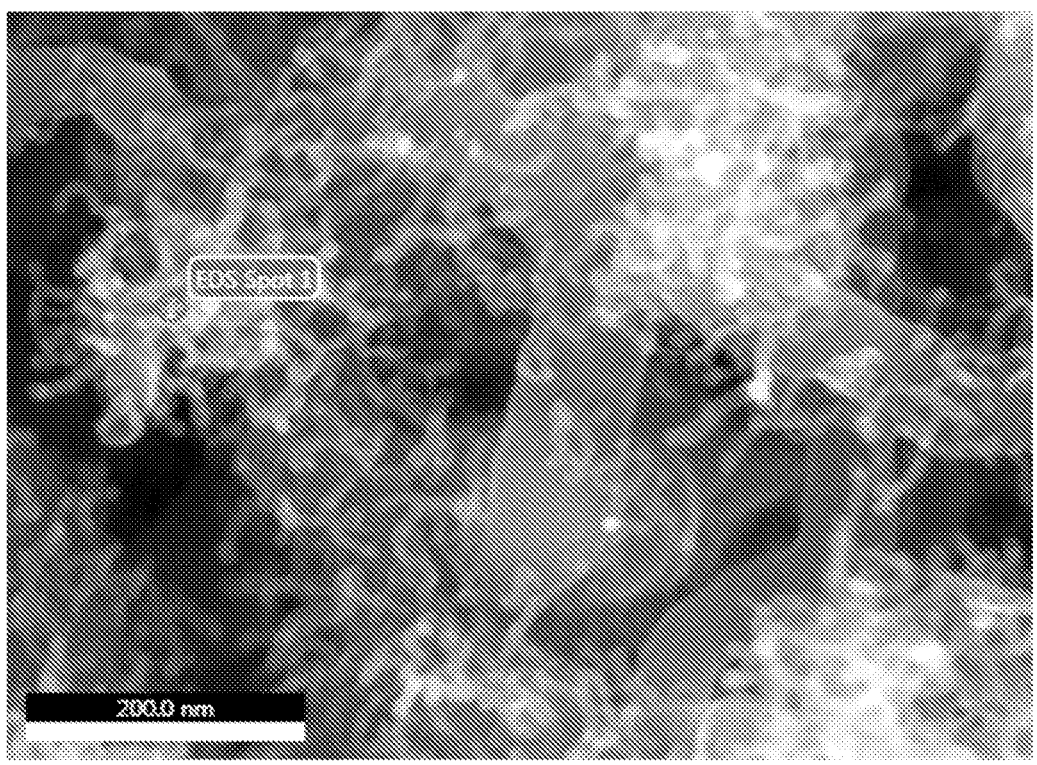
FIG. 16 shows scanning electron micrographs of wrapped-graphene prepared as disclosed in Example 7.

About 15 g of corn extract was heated slowly from room temperature at a rate of 15° C./min to 1000° C. in a reducing atmosphere comprised of 100% hydrogen gas flowing at 100 ml/min. The sample was held at 1000° C. for 1 hour in reducing atmosphere, then cooled down to room temperature under inert atmosphere. FIG. 16 shows an electron micrograph of the resulting wrapped graphene sheet-like structure with branches of smaller nanosheets. The elemental composition of the nanosheets is provided in Table 6.

TABLE 6

| EDS location | Element | Weight % | Atomic % | Net Int. | Error % | K ratio |
|---|---|---|---|---|---|---|
| Spot 1 | C K | 91.50 | 93.97 | 2293.33 | 2.85 | 0.8750 |
| | O K | 7.35 | 5.67 | 76.64 | 12.37 | 0.0175 |
| | K K | 1.15 | 0.36 | 17.83 | 19.52 | 0.0094 |

Example 8: Fabrication of Lithium-Ion Batteries

Lithium-ion batteries were fabricated with synthesized doped carbon nanosheet and the electrochemical performance of the resulting electrodes was evaluated. The unusual combination of ultrahigh surface area and large pore volume of synthesized doped carbon nanosheet facilitated Li-ion migration during charge and discharge cycles. In addition, the electrode reduce heat-build up and swelling that is commonly experienced in graphite-based electrodes at high rates.

The coin cell (2032, Pred Materials) active anode material was made from carbon nanosheet prepared by according to procedure in Example 2. Several samples were tested with different adsorption properties: sample A and sample B. Sample A carbon nanosheet had a BET surface area of 2343 $m^2/g$, pore volume of 4.9 ml/g, and the adsorption average pore width (4V/A by BET) of about 8.3 nm. Sample B had a BET surface area of 1879 $m^2/g$, pore volume of 3.9 ml/g, with an average pore width of 10.0 nm.

About 80 wt % synthesized doped carbon nanosheet powder, 10 wt % conductive carbon black (Timcal, Super C65), and 10 wt % polyvinylidene fluoride (PVDF) binder (Aremka, Kynar HSV900) were mixed with 1-methyl-2-pyrrolidone (NMP) and the slurry was stirred overnight. The slurry was cast onto a clean copper or aluminum foil current collector and spread uniformly on the current collector using a doctor blade with a blade height of 20-500 μm. The electrode mass loading was 0.25-4.5 mg/$cm^2$ active material. The obtained electrode sheet was dried overnight within a fume hood and then transferred to a 60° C. oven to bake the electrode into a solid overnight. Discs (0.5 inches in diameter) of the dried electrode sheets were then pressed out and dried in a vacuum oven at 120° C. for 16 hours.

The coin cell (2032, Pred Materials) was fabricated in an inert atmosphere glovebox (Argon, ≤1 ppm $H_2O$) using the electrode disc, a separator (MTI Corp.), a metallic lithium counter/reference electrode, and Sigma-Aldrich electrolyte. The electrolyte consisted of 1 M $LiPF_6$ in ethylene carbonate (EC):dimethyl carbonate (DEC). The volume ratio of EC/DEC was 50/50. Galvanostatic charge/discharge measurements were performed over a voltage range of 0.01-3.0 V versus Li on an Arbin Instruments BT2043 test station using mass-normalized current of 37.2 mA/g based on the active material mass.

Figure 17:
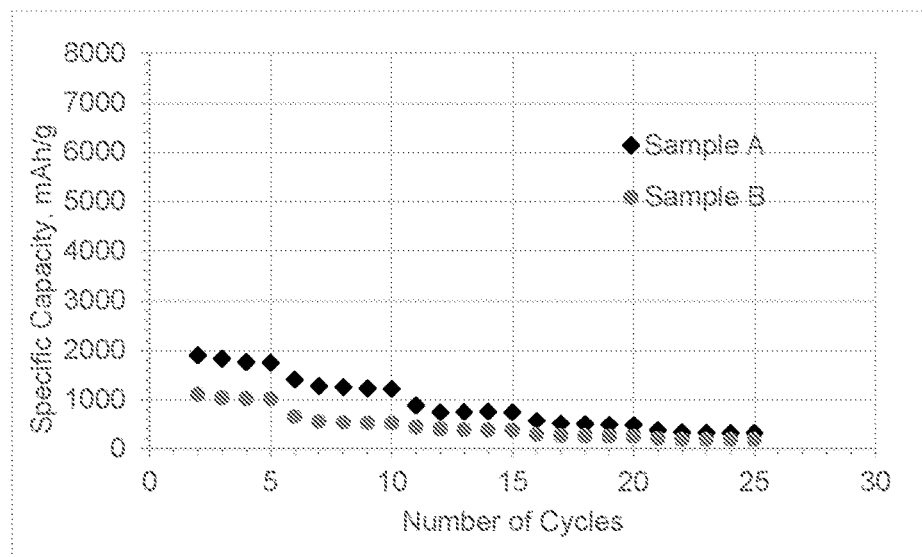
FIG. 17 shows the rate test of coin cells showing the performance of sample A and B as active anode material at different rates.
Figure 18A:
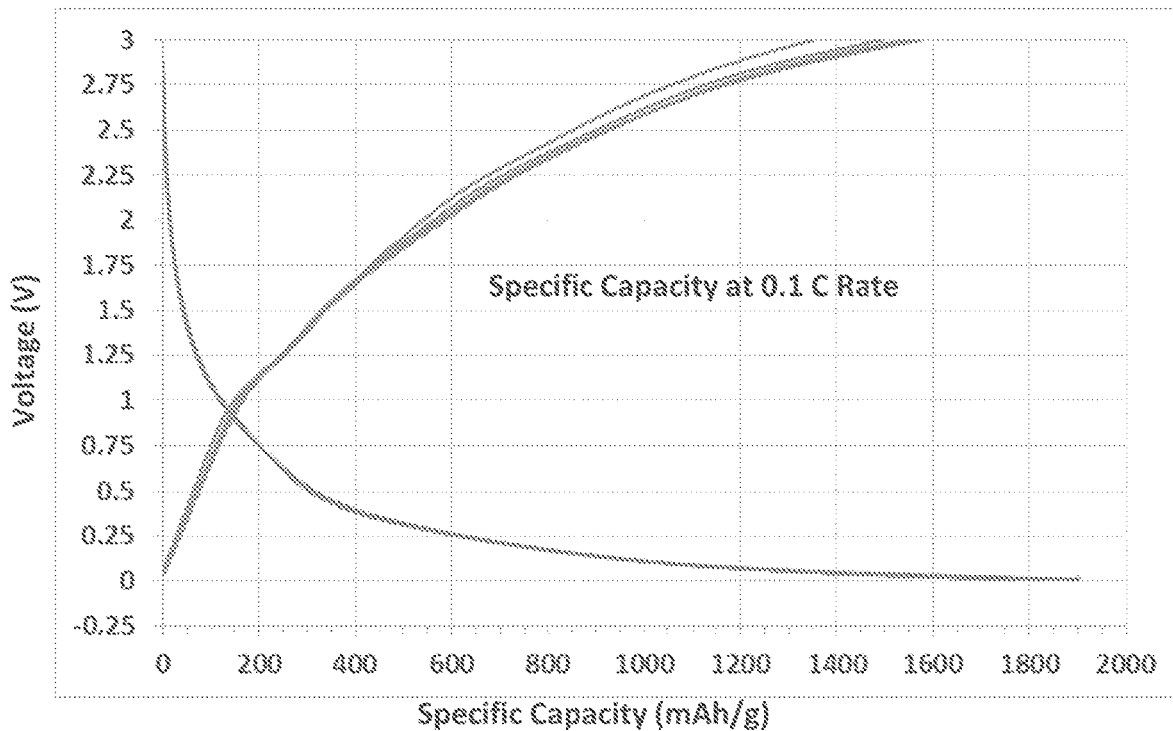
FIGS. 18A-18C show the rate test data of coin cell of sample B at different rates.
Figure 18B:
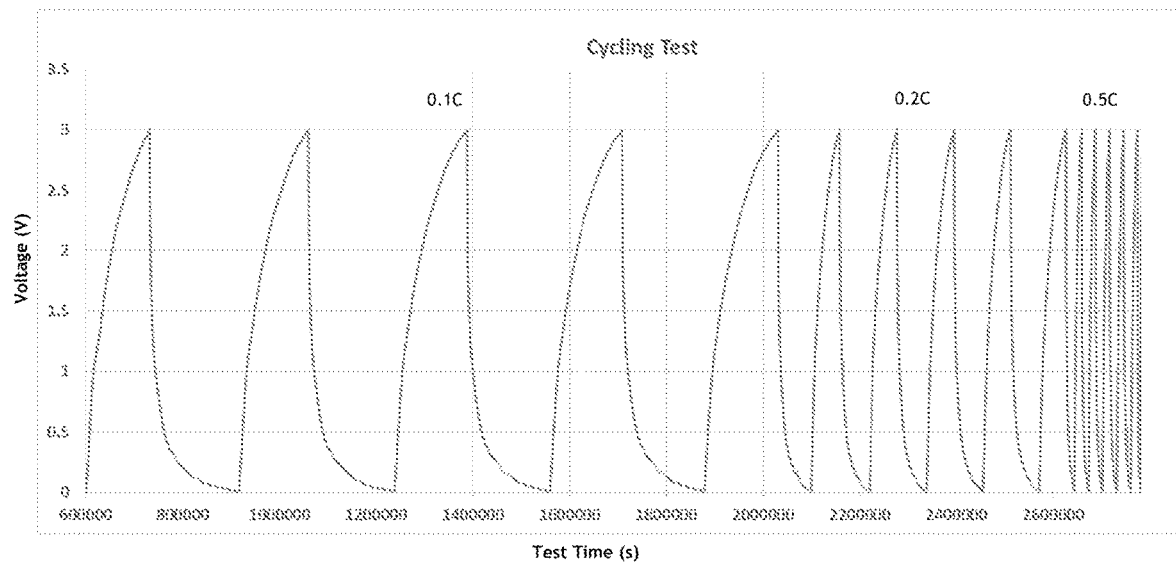
Figure 18C:
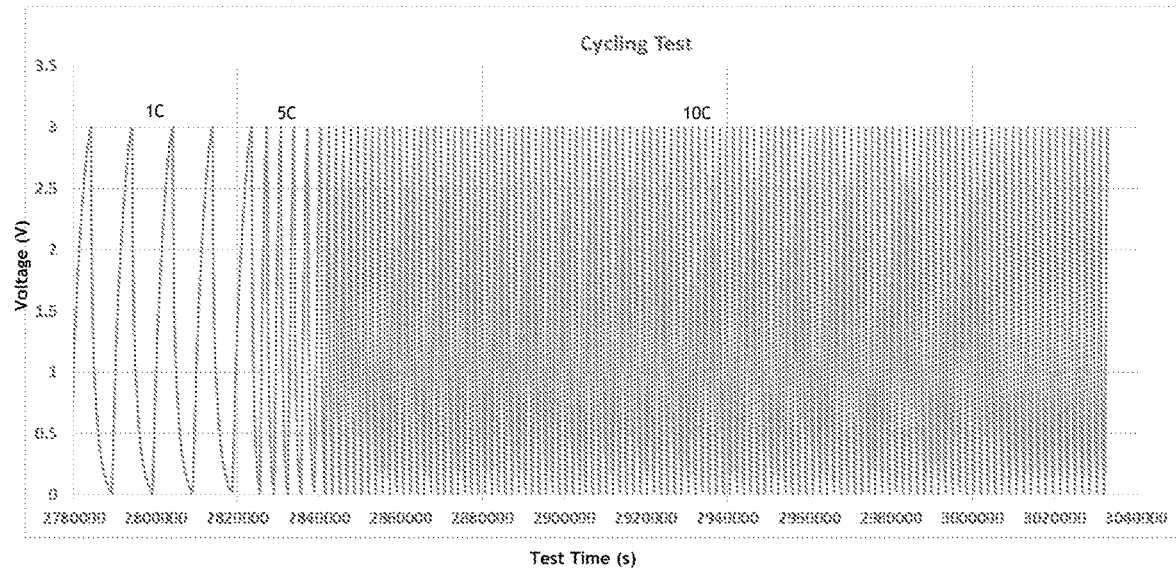

FIG. 17 shows rate test of samples A and B, and FIGS. 18A-18C show the rate test data of coin cell of sample B at different rates. This data indicates that the trend of the rate data for both samples is similar, although their specific capacity are different at each test rate. The initial test data showed sample A has a specific capacity of 1900 mAh/g at a charge/discharge rate of 100 mA/g (0.1 C), which is a more than 5× increase in capacity of standard anode material, graphite, which has a theoretical capacity of 372 mAh/g. It was observed that at 0.1 C, 1 C, 2 C, and 5 C test rates, the sample A exhibited specific capacity that was almost double of the sample B. Even at a test rate of 10 C, sample A average specific capacity of 327 mAh/g was higher than that of sample B, 191 mAh/g. Without being bound by a specific theory, it is believed that the increase in specific capacity of sample A is due to synergetic effect of its higher surface area and pore volume compared with sample B.

Doped-carbon nanosheet powders prepared by Example 2 were used to prepare composite slurries for fabricating 11 additional electrodes for Li-ion battery. The composition details of each slurry is as listed in Table 7. These slurries resulted in good adhesion and cohesion of the doped-graphene on the current collectors.

TABLE 7

| | Components (wt %) | | | | | | | | |
|---|---|---|---|---|---|---|---|---|---|
| Ex. | Doped-Graphene | Conductive carbon black | CNT[1] | Denka Black | NMC[2] | CMC[3] | PVDF[4] | PEO[5] | SBR[6] |
| 8-1 | 90 | | | | | | 10 | | |
| 8-2 | 90 | 5 | | | | | 5 | | |
| 8-3 | 84 | 1 | | | | 3 | | | 12 |
| 8-4 | 91 | 1 | | | | 2 | | | 6 |
| 8-5 | 90 | | | | | 5 | | 5 | |
| 8-6 | 90 | | | | | | | 10 | |
| 8-7 | 90 | | | | | 5 | | 5 | |
| 8-8 | 45.5 | | 45.5 | 1 | | 2 | | | 6 |
| 8-9 | 91 | | 0.5 | 0.5 | | 2 | | | 6 |
| 8-10 | 50 | | | | 50 | | 10 | | |
| 8-11 | | 10 | | | 50 | | 10 | | |

[1]CNT is carbon nanotube;
[2]NMC is lithium nickel manganese cobalt oxide;
[3]CMC is carboxymethyl cellulose;
[4]PVDF is polyvinylidene fluoride;
[5]PEO is poly(ethylene oxide);
[6]SBR is styrene butadiene rubber.

Figure 19:
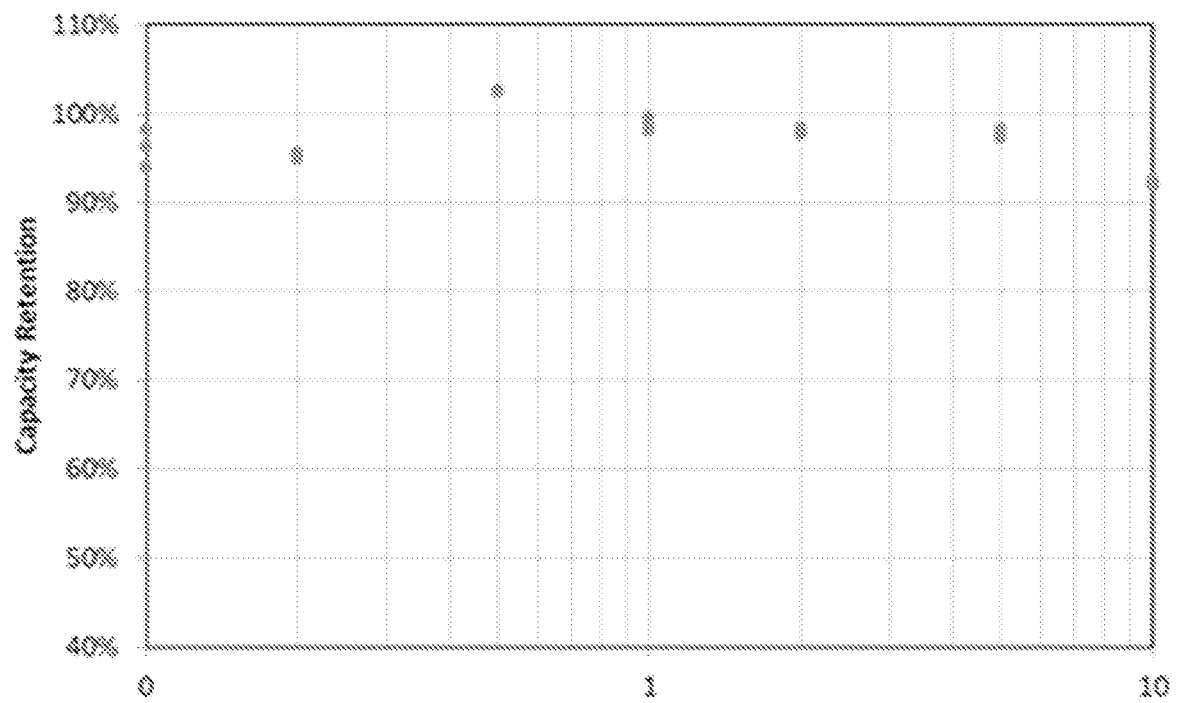
FIG. 19 shows the delithiation rate mapping of the coin cell rate capability, as an average of up to 9 cells. Discharge C-Rate of "0" shows 0.1 C. Top panel shows the mapping of baseline anode, and the bottom panel shows the mapping of the electrode prepared from the carbon nanomaterial as disclosed in Example 8-4.
Figure 19:
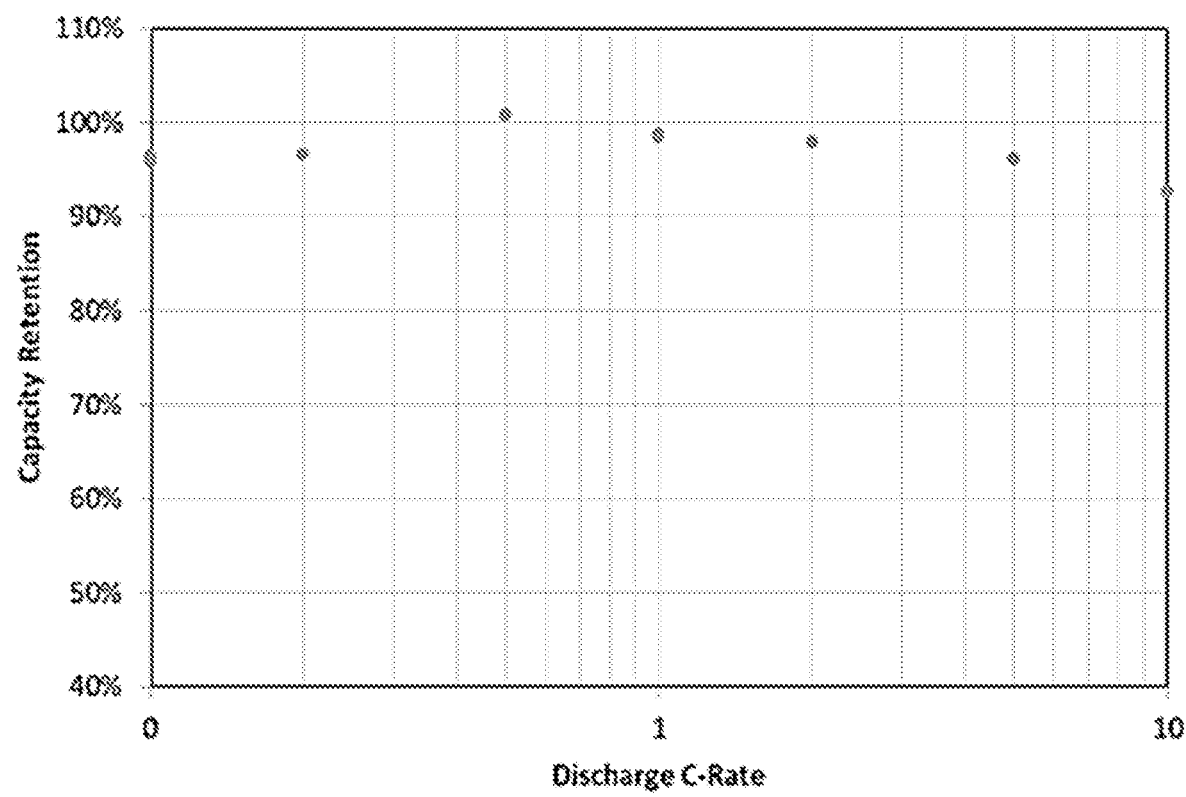
Figure 20:
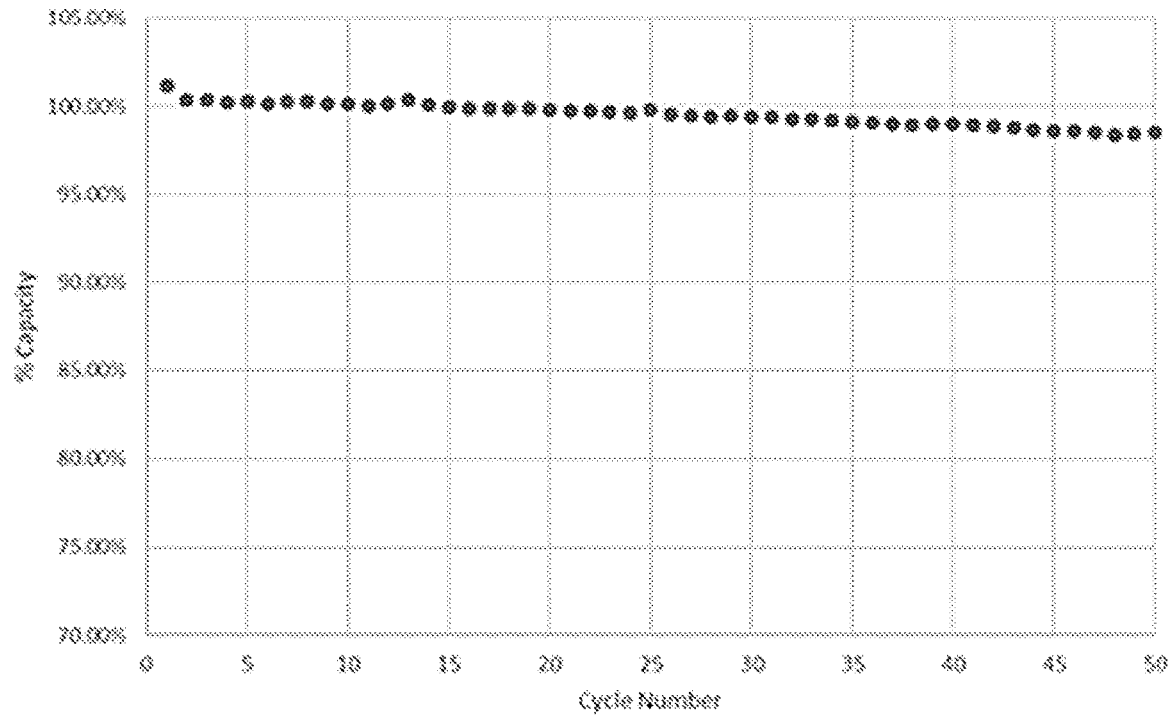
FIG. 20 shows the initial cycling of the coin cell cycle life, as an average of up to 9 cells. Top panel shows the cycling of baseline anode, and the bottom panel shows the cycling of the electrode prepared from the carbon nanomaterial as disclosed in Example 8-4.
Figure 20:
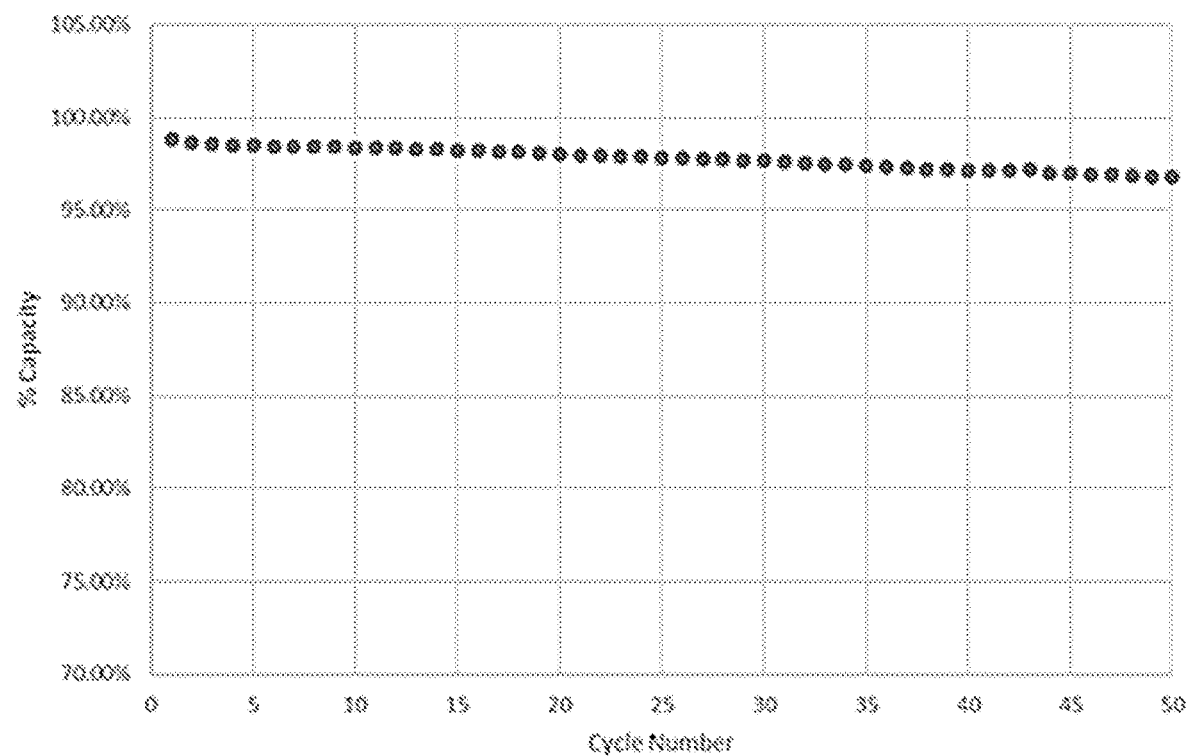

The electrochemical performance of cell that were fabricated using the composition 8-4 is presented in FIGS. 19 and 20 (as compared to baseline anode).

Example 9

The composited slurry of Example 8-4 prepared as disclosed herein was used to fabricate a full cell comprising copper foil coated with oxygen/phosphorus doped-graphene (metal-free) as an anode, aluminium foil coated with metal-doped-graphene as a cathode, a separator (MTI Corp.), an electrolyte, and a metallic lithium counter/reference electrode. The electrolyte comprised lithium hexafluorophosphate ($LiPF_6$). Tables 8 and 9 show the performance of the full cell.

TABLE 8

| | Coin Cell Results at 0.01 V/min | | | | | |
|---|---|---|---|---|---|---|
| Cell | g active | D 1 | D 2 | C 1 | C2 | Initial Capacity (mAh/g) |
| Baseline | 0.005189 | 2.0613 | 1.9256 | 1.8807 | 1.8946 | 397.24 |
| 1 | 0.00091 | 2.5589 | 0.4473 | 0.3673 | 0.3003 | 2811.9 |
| 2 | 0.001183 | 2.7681 | 0.4916 | 0.3859 | 0.3259 | 2339.8 |
| 3 | 0.000819 | 2.4329 | 0.4033 | 0.3451 | 0.2779 | 2970.5 |
| 4 | 0.001964 | 2.4167 | 0.4065 | 0.3386 | 0.2765 | 1230.4 |
| 5 | 0.000546 | 1.8964 | 0.344 | 0.3017 | 0.2391 | 3473.2 |
| 6 | 0.000728 | 2.3075 | 0.03964 | 0.343 | 0.2758 | 3169.6 |

TABLE 9

Full Cell Results

|  | Cell | g active | D 1 | D 2 | C 1 | C2 | Capacity (mAh/g) |
|---|---|---|---|---|---|---|---|
| Doped-Graphene | 1 | 0.00118 | 3.4311 | 0.5904 | 0.4488 | 0.3621 | 2900.33812 |
| Anode | 2 | 0.00127 | 3.0198 | 0.5026 | 0.4167 | 0.3269 | 2370.32967 |
| NMC Cathode | 2 | 0.01437 | 2.4662 | 2.1469 | 2.1403 | 2.1495 | 171.525942 |

It is understood that the examples and embodiments described herein are for illustrative purposes only and that various modifications or changes in light thereof are suggested to persons skilled in the art and are to be incorporated within the spirit and purview of this application and scope of the appended claims. All publications, patents, and patent applications cited herein are hereby incorporated herein by reference for all purposes.

What is claimed is:

1. A process for preparing a carbon nanomaterial, wherein the carbon nanomaterial is doped and/or intercalated, the process comprising:
   providing a carbon-containing material to a reactor comprising a solvent;
   providing one or more of: an oxidizing or reducing solution, and a doping and/or intercalating agent to the reactor comprising the carbon-containing material to obtain a reaction mixture,
   heating the reaction mixture to a temperature and for a time period sufficient to obtain an intermediate material;
   further comprising contacting the intermediate material with one or more of hydrazine, lithium aluminum hydride, diborane, and sodium borohydride prior to further heating; and
   further heating the intermediate material to a temperature and for a time period sufficient to obtain the carbon nanomaterial.

2. The process of claim 1, wherein the carbon nanomaterial is Li-, Na-, O-, P-, K-, and/or Si-doped.

3. The process of claim 1, wherein the carbon nanomaterial is in a form of a particulate, porous foam, film, or pellet, or is dispersed in a solvent.

4. The process of claim 1, wherein the carbon-containing material comprises carbon nanosheet, graphene, fullerene, amorphous carbon, graphene oxide, carbon black, activated carbon, charcoal, carbon nanotubes, graphite, coal, or a combination of two or more thereof.

5. The process of claim 1, wherein said carbon-containing material is or is derived from the group consisting of cassava root, tapioca flour, yam root, potato root, sugarcane, sugar beet, sucrose, rice grain, corn, and wheat grain.

6. The process of claim 1, wherein the solvent is distilled water, deionized water, ethanol, N-methyl-2-pyrrolidone, ethylene glycol, propylene glycol, or a combination thereof.

7. The process of claim 1, wherein the oxidizing or reducing solution is selected from one or more of: sodium hydroxide, potassium hydroxide, hydrochloric acid, phosphoric acid, phosphorous acid, and nitric acid.

8. The process of claim 1, wherein the doping and/or intercalating agent selected from lithium chloride, 3,4-dihydroxybenzonitrile dilithium, lithium hydroxide, lithium acetate, lithium citrate, lithium bis(trifluoromethylsulfonyl) imide, lithium hexafluorophosphate, aluminium triacetate, calcium hydroxide, magnesium acetate, silicon oxide, and a combination of two or more thereof.

9. The process of claim 1, wherein the doping and/or intercalating agent is lithium acetate or silicon oxide.

10. The process of claim 1, wherein the temperature sufficient to obtain the intermediate material is in a range of about 45 to 1050° C., and the temperature sufficient to obtain the carbon nanomaterial is in a range of about 500 to 1500° C.

11. A process for preparing a carbon nanomaterial, wherein the carbon nanomaterial is doped and/or intercalated, the process comprising:
   providing a carbon-containing material to a reactor comprising a solvent;
   providing one or more of: an oxidizing or reducing solution, and a doping and/or intercalating agent to the reactor comprising the carbon-containing material to obtain a reaction mixture, heating the reaction mixture to a temperature and for a time period sufficient to obtain an intermediate material;
   washing the carbon nanomaterial with hydrogen peroxide or hydrochloric acid to obtain a washed carbon nanomaterial;
   rising the washed carbon nanomaterial with distilled or deionized water to obtain a rinsed carbon nanomaterial; and
   heating the rinsed carbon nanomaterial in an third gas at a temperature in a range of about 700 to 1500° C. to obtain the carbon nanomaterial having a BET surface area of at least 1900 m$^2$/g and pore volume of at least 2.4 cm$^3$/g.

12. The process of claim 11, further comprising contacting the intermediate material with one or more of hydrazine, lithium aluminum hydride, diborane, and sodium borohydride prior to further heating.

13. A process for preparing a carbon nanomaterial film, wherein the carbon nanomaterial is doped and/or intercalated, the process comprising:
   performing the process of claim 1 to provide a carbon nanomaterial;
   providing the carbon nanomaterial and one or more of additives selected from a conductive agent, binder, and thickening agent, to a second solvent to obtain the slurry of the carbon nanomaterial;
   coating a surface of a substrate with the slurry to obtain a coated substrate; and
   heating the coated substrate to a temperature and for a time period sufficient to obtain the carbon nanomaterial film.

14. The process of claim 13, wherein the temperature sufficient to obtain the film is in a range of about 25 to 150° C.

15. A process for preparing a nanocomposite comprising a carbon nanomaterial, wherein the carbon nanomaterial is doped and/or intercalated, the process comprising:
   performing the process of claim 1 to provide a carbon nanomaterial; and providing the carbon nanomaterial to a polymer to obtain the nanocomposite.

16. The process of claim 15, wherein the carbon nanomaterial is provided in an amount sufficient to increase one or more of mechanical, absorption, adsorption, electrical, electronic, magnetic, and optical properties of the nanocomposite by at least a factor greater than 1 compared to the same properties of the polymer.

* * * * *